United States Patent [19]

Colon et al.

[11] 4,331,576

[45] May 25, 1982

[54] WATER-SOLUBLE, PRESSURE-SENSITIVE, HOT-MELT ADHESIVES

[76] Inventors: Herman Colon, 2 Sobrisco St., Monsey, N.Y. 10952; Albert Maletsky, 732 Iron Latch Rd., Franklin Lakes, N.J. 07417

[21] Appl. No.: 229,467

[22] Filed: Jan. 29, 1981

[51] Int. Cl.$^3$ ............................. C09J 3/14; C09J 7/02
[52] U.S. Cl. .................................. 524/271; 156/331.6; 427/208.2; 427/208.4; 428/211; 428/343; 428/913; 428/914; 524/272; 524/322
[58] Field of Search .............. 260/23 R, 27 R, 23 H; 428/913, 914, 211, 343; 427/208.2, 208.4; 156/331.6

[56] References Cited

U.S. PATENT DOCUMENTS

| | | | |
|---|---|---|---|
| 2,875,101 | 2/1959 | Ehrlich | 427/208.4 |
| 3,462,342 | 8/1969 | Cooper et al. | 428/334 |
| 3,576,776 | 4/1971 | Muszik et al. | 260/22 R |
| 3,852,231 | 12/1974 | Huebschmann et al. | 260/28.5 R |
| 3,873,405 | 3/1975 | Wilkes | 428/343 |
| 3,888,811 | 6/1975 | Sirota et al. | 260/23 R |
| 4,268,575 | 5/1981 | Shinozaki et al. | 428/913 |

Primary Examiner—Ronald W. Griffin
Attorney, Agent, or Firm—Erwin S. Teltscher

[57] ABSTRACT

This invention relates to water-soluble, pressure-sensitive, hot-melt adhesives; and more specifically to hot-melt adhesives for labels and pressure-sensitive labels. The labels can be readily removed by application of water to the adhesive to facilitate peeling from the article; the adhesives are based upon certain vinyl pyrrolidone polymers.

4 Claims, No Drawings

WATER-SOLUBLE, PRESSURE-SENSITIVE, HOT-MELT ADHESIVES

FIELD OF THE INVENTION

This invention relates to water-soluble, pressure-sensitive, hot-melt adhesives; and more specifically to hot-melt adhesives for water-peelable, pressure-sensitive adhesives. Labels affixed to substrates and other items joined by these adhesives can be separated by applying water to the adhesive.

BACKGROUND OF THE INVENTION

Pressure-sensitive, hot-melt adhesives are usually made up of two general types. In one type, the product to be affixed to an object, for example a label, is of a permanent nature. In the other, the label, originally affixed to an object, is expected to be peeled off at a later date. But, since there are many surfaces with different and distinct adhesive characteristics, supplying non-permanent pressure-sensitive, hot-melt adhesives can be a problem. Insufficient tack could lead to premature failure, while very aggressive adhesives would not be removable except by applying excessive force. The aggressive adhesives are not water releasable, and therefore cannot be peeled off by the application of water or by wetting, for example with a wet paper towel. An answer to this problem can be found in employing a pressure-sensitive hot-melt adhesive which can be removed with the aid of a wet paper product, for example.

As an illustration, if a permanent label on a piece of porcelain is to be removed, it might have to be scratched off. That could be a risky procedure, as the porcelain surface might be scratched and any records on the label destroyed in the process. On the other hand, a temporary label might fall off before the procelain object is sold, and thus the manufacturer's identification, directions, or seal would be lost. With a "wash-away", or water-soluble label, the adhesion can be strong yet, when desired, the label can be loosened and removed by wetting the label with, for example, a wet paper towel.

This novel adhesive product is a serendipitous result of work toward development of a remoistenable, non-blocking hot-melt adhesive with a non-bitter taste, as would be needed to seal an envelope.

In previous work attempting to achieve remoistenable hot-melt adhesives for envelopes, a remoistenable adhesive had been perfected, but the product suffered from an undesirable bitter taste. This bitter taste was due to such key ingredients as the rosin or tall oil acids present in the formula. Replacing this type of compound, for example, with its ester, cured one problem and caused another, namely, a poor bonding quality. Recently, it was found that high acid number organic compounds, such as free fatty acids, overcame this drawback without causing any loss of bonding characteristics. Thus it is possible to provide "lickable envelopes" according to the invention described in our copending application Ser. No. 200,392, filed on Oct. 24, 1980, and entitled "Water-activatable Hot-melt Adhesives". During this development work, it was noticed that the use of an excess of liquid fatty acids beyond the limits described in our above-noted copending application renders the adhesive pressure-sensitive. Thus, the possibility arose of making a water-soluble (peelable), pressure-sensitive, hot-melt adhesive.

Of course, the non-bitter qualities so necessary for envelopes were now no longer required, and the new adhesive can now include rosin products and optionally certain types of polyamides to improve the product.

SUMMARY OF THE INVENTION

A water-soluble (peelable) pressure-sensitive hot-melt adhesive is obtained by the discovery that the use of free fatty acids and mixtures thereof, having chains of at least 14 carbon atoms and having acid numbers over 160, but preferably in the range of 190 to 230 together with VP/VA copolymer, or vinyl pyrrolidone homopolymer form a hot-melt mixture, which when applied to a substrate provides a pressure-sensitive film thereon which is water-soluble. In tests on flexible paper stock, polymer films, metal foils and the like, coated with this product, when pressed against either glass, polymer, steel or similar solid surfaces, there results a strong bond which on dry separation ends in a tear bond. However, contacting the adhesive layer with water causes rapid release of the bond.

The invention is based upon the following formula:

(a) 35–65 wt.% of polymers comprising 35–82 wt.% of water-sensitive vinyl pyrrolidone/vinyl acetate copolymers (VP/VA) or vinyl pyrrolidone homopolymers, and (b) 35–50 wt.% of at least one free monobasic saturated or unsaturated fatty acid having an acid number above 137, preferably in the range of 160 to 210.

Preferred ranges of the necessary ingredients for this invention are:

| | |
|---|---|
| fatty acid | 35–45% |
| PVP/VAC copolymer or PVP | 35–45% |
| Polyamide | 5–15% |

DETAILED DESCRIPTION AND PREFERRED EMBODIMENTS

The copolymer ingredients of the adhesive formulations are based upon vinyl pyrrolidone/vinyl acetate (VP/VA) copolymers used in some cases with vinylpyrrolidone homopolymer.

Satisfactory copolymers and homopolymers in the solid state are marketed by GAF Corp. (N.Y.C., N.Y., United States) under the trade name PVP 630, and by BASF of West Germany. Other copolymers and mixtures of copolymers of different proportions are commercially available and are usually marketed in solution form by GAF (USA) and BASF (West Germany). Prior to use in hot-melt adhesives, those solutions must be subjected to removal of the solvents. The water sensitivity of these polymers provides a water-activatable quality, as well as a pressure-sensitive property for the final adhesive formulation for use as a coating on the substrate.

The total polymer content may range from 35–65 wt.% of the formulation. The amount of VP/VA copolymer may range from 35 wt.% to 100 wt.% of polymers in the formulation, while the homopolymer range is from (35–40) wt.%. The polyamide can be either of low amine number types (10–28) or of high acid number (80–140). The lower amine polyamide is produced by Emery Inc., while the high acid number polyamide is produced by Crosby Inc. of Los Angeles. The amount of polyamide may range from 0–28 wt.% in the formulation. The presence of the polyamides in the formulation increases pressure sensitivity. Also, the presence of polyamides reduces the cost of the product and minimizes staining of substrates.

The amount of liquid fatty acid used may range from (15–50) wt.% of the total formulation. The use of more than 15 wt.% of liquid fatty acid renders the hot-melt pressure-sensitive and water-soluble. The free fatty acids also control the water-uptake of the vinyl pyrrolidone portions of the polymer component and render the resultant film water-swellable and ultimately water-soluble or water-peelable. The fatty acids useful for the present invention are liquid aliphatic straight chain free fatty acids and also high acid number rosin or tall oil products which may be used in conjunction therewith.

Commercial liquid fatty acids may be blended with each other or with high acid number (more than 130) rosin or tall oil products. The acids, when mixed should be able to withstand 350° F. for 48 hours, without serious chemical degradation as evidenced by color or odor. These high acid number (at least 14 carbon atoms) fatty acids are preferably used at 35–50 wt.% for their unique ability to render this polymer pressure-sensitive and yet water-swellable and thus water-peelable, so that any label to which the adhesives are applied can subsequently readily be peeled from the product to which it was originally affixed, by the expedient of water wetting the adhesive layer.

The following formulations are representative and preferred for specific uses. It must be realized that no single formulation is satisfactory for all substrates. Various paper products, foils, metal, polymers and textile substrates require different and various formulations within the stated ranges.

EXAMPLE 1

| | |
|---|---|
| Emersol 871 (Fatty acid) | 16.3 |
| Sylvatac 95 (rosin product) | 16.3 |
| Dantocol (plasticizer) | 19.2 |
| Gantron (VP/VA copolymer) | 48.1 |
| Irganox 1010 (anti-oxidant) | .1 |

The non-polymer fraction is heated and mixed until uniform and thin. The polymer is then added with continued heat and stirring until completely dissolved. The initial viscosity at 300° F. is 2700. When paper, coated with this product, is pressed, for example on steel or glass, there results a strong bond, which on dry separation, results in a tear bond.

A paper towel dampened with tap water at 130° F. and applied to a label affixed to a glazed, ceramic plate loosened the adhesive after 8 minutes and the label could be peeled off.

EXAMPLE 2

| | |
|---|---|
| Emersol 871 (Fatty acid) | 8.0 |
| Myvacet 5-07 (glyceryl fatty ester) | 8.0 |
| Sylvactac 94 (rosin product) | 16.0 |
| Dantocol (plasticizer) | 20.0 |
| Gantrol (copolymer) | 47.0 |
| Irganox 1010 (anti-oxidant) | .1 |

This product has similar characteristics to Example 1. A paper label affixed to a stainless steel tray and baked thereon at 150° F. for 6 hours could easily be removed from the tray by wetting the label with a paper towel as in Example 1. No stain to the tray was noted.

EXAMPLE 3

| | |
|---|---|
| Emersol 871 (Fatty acid) | 50.0 |
| Gantron (copolymer) | 50.0 |
| Irganox 1010 (anti-oxidant) | .1 |

This product has similar characteristics to Example 1. A printed cellophane label was adhered to a glass jar with a thin film of the formulation. After 10 days aging, the edge of this label was subjected to a stream of water at 95° F. The label peeled off in 5 minutes.

EXAMPLE 4

| | |
|---|---|
| Emersol 871 (Fatty acid) | 19.3 |
| Sylvatac 95 (rosin product) | 19.3 |
| Dantocol (plasticizer) | 22.7 |
| Luviskol K30 (homopolymer) | 38.6 |
| Irganox (anti-oxidant) | .1 |

This product has similar characteristics to Example 3.

EXAMPLE 5

| | |
|---|---|
| Emersol 871 (Fatty acid) | 45.0 |
| Gantron (copolymer) | 45.0 |
| Emerez 1556 (polyamide) | 10.0 |
| Irganox (anti-oxidant) | .1 |

Example 5 has characteristics similar to those of Example 2, and is preferred for paper labels.

EXAMPLE 6

| | |
|---|---|
| Emersol 871 (Fatty acid) | 45.0 |
| Gantron (copolymer) | 45.0 |
| Emery (polyamide resin) 1556 | 5–10 |
| Irganox (anti-oxidant) | 0.1 |

EXAMPLE 7

| | |
|---|---|
| Emersol 871 (Fatty acid) | 41.6 |
| Gantron (Copolymer) | 41.6 |
| Cropolamide resin (polyamide) | 16.6 |
| Irganox (anti-oxidant) | 0.1 |

The adhesives of this invention are applied to the substrate in thin film form as a hot-melt. Application may be via a roller, dip plus doctor blade, printed dots via heated offset rollers, and similar appparatus for applying hot-melt adhesives.

The cooled substrates with the applied adhesive may be stored in rolls or sheets. Preferably the adhesive should be applied after the printing. The label stock may be any label stock. The paper stock may be water-permeable, or if coated, the coating should be, preferably but not necessarily, water-permeable, permitting the water to soak through to the adhesive layer. However, if a water-shedding coating is used, the label can still be removed by streams of water impinging on the edge of the label and having access by entry of water under the edge to the adhesive layer. As long as an edge of the label provides easy access of water to the adhesive layer, the label can be easily peeled by streams of water swelling and parting the adhesive.

The label or substrate may also be made from printed plastic foils or films and even from metal or metallized foils. These adhesive substrates of course are not readily water permeable. Here, too, the label can be readily removed by streams of water or water vapor introduced to the adhesive along the edges of the label.

The labels, according to this invention, comprising the substrate films, foils or papers coated with the adhesives mentioned above are particularly useful in conditions where the labels should be removed from the article. Examples of such labels are those used on drug vials which are to be replaced by the pharmacist with his own label; labels which are to be removed and submitted in connection with premium or proof of purchase promotions, and labels which should be removed as interfering with the decorative or functional purposes of the article.

The adhesives of this invention while disclosed with regard to use on labels and coacting with labels, can also be used to join two or more articles together, yet permit the separation of the individual articles by the mere expedient of applying water to the adhesive joint. The uses of such joined, and separable, articles are particularly valuable to the packaging arts and have other myriad uses.

We claim:

1. A water-soluble, pressure-sensitive, hot-melt adhesive composition comprising:
   (a) 30 to 65 wt.% of total polymer components; said polymer components comprising 35 to 100 wt.% of water-sensitive vinyl pyrrolidone/vinyl acetate copolymers, any balance comprising polymers selected from the group consisting of vinyl pyrrolidone homopolymers, low amine number (10–28) polyamides, polyamides with acid numbers in the range 80 to 140 and ethylene/vinyl acetate copolymers containing 17 to 50 wt.% of vinyl acetate;
   (b) 35 to 50 wt.% of at least one free monobasic saturated or unsaturated fatty acid having an acid number higher than 137; and
   (c) the balance being selected from the group of tall oils, rosin acids, anti-oxidants, and plasticizers for said polymers.

2. A water-peelable label comprising a foil substrate coated on at least one surface thereof with the pressure-sensitive adhesive formulation according to claim 1.

3. An assembly consisting of an article having affixed thereto the water-peelable, pressure sensitive label according to claim 2.

4. An adhesive-joined assembly comprising a plurality of juxtaposed articles adhering to one another along respective juxtaposed surfaces of said articles by the adhesive formulation according to claim 1.

* * * * *